UNITED STATES PATENT OFFICE.

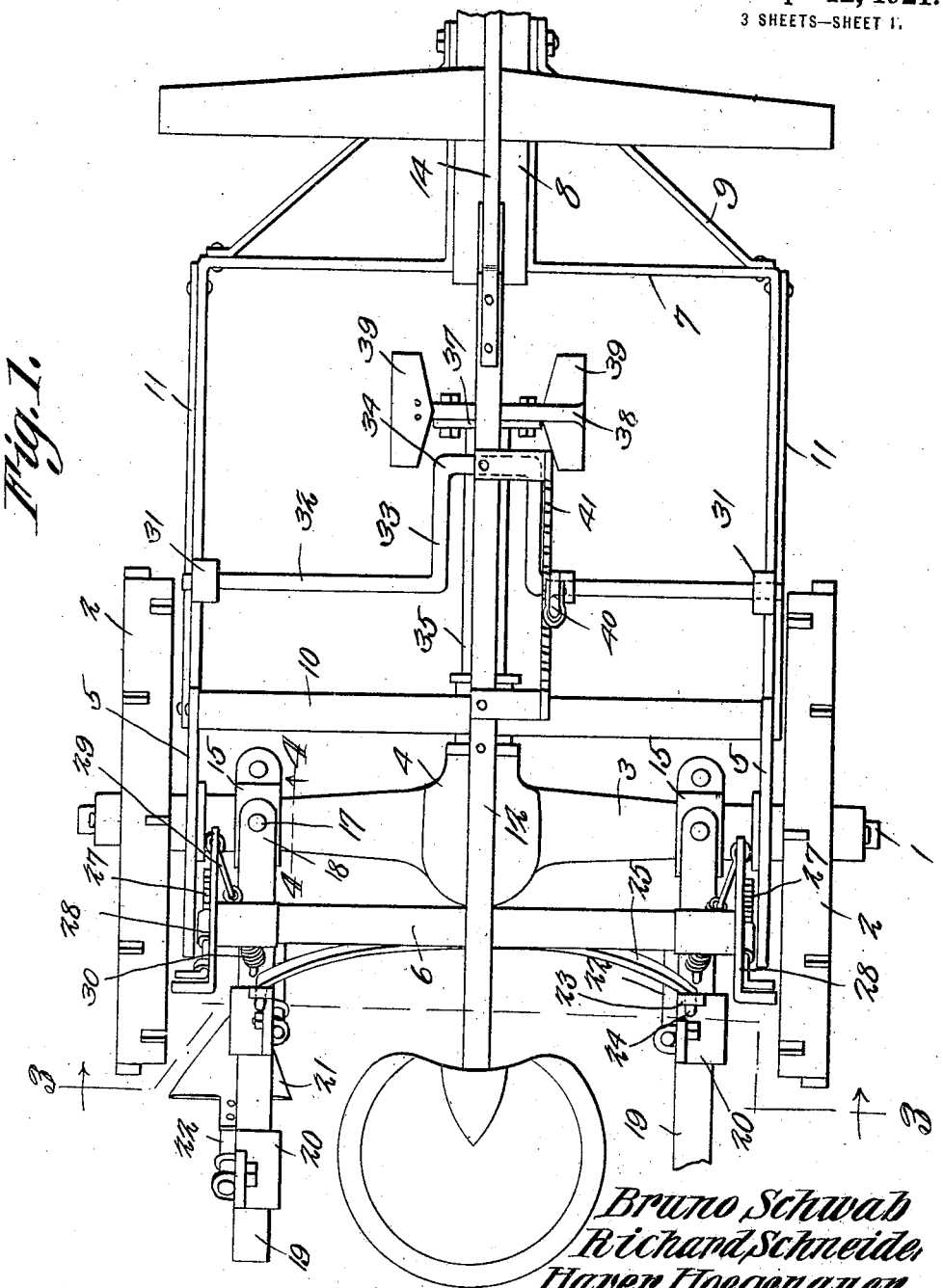

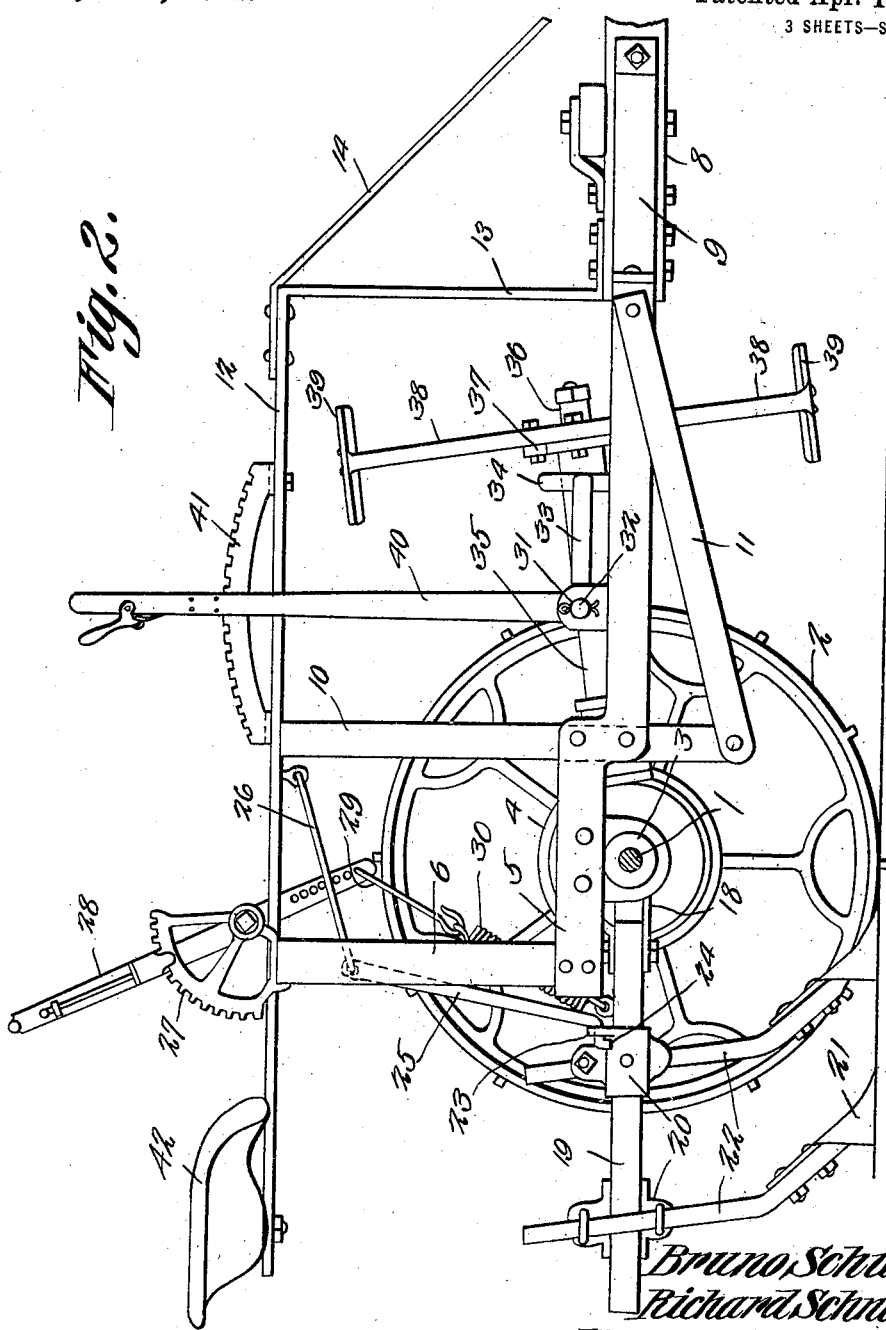

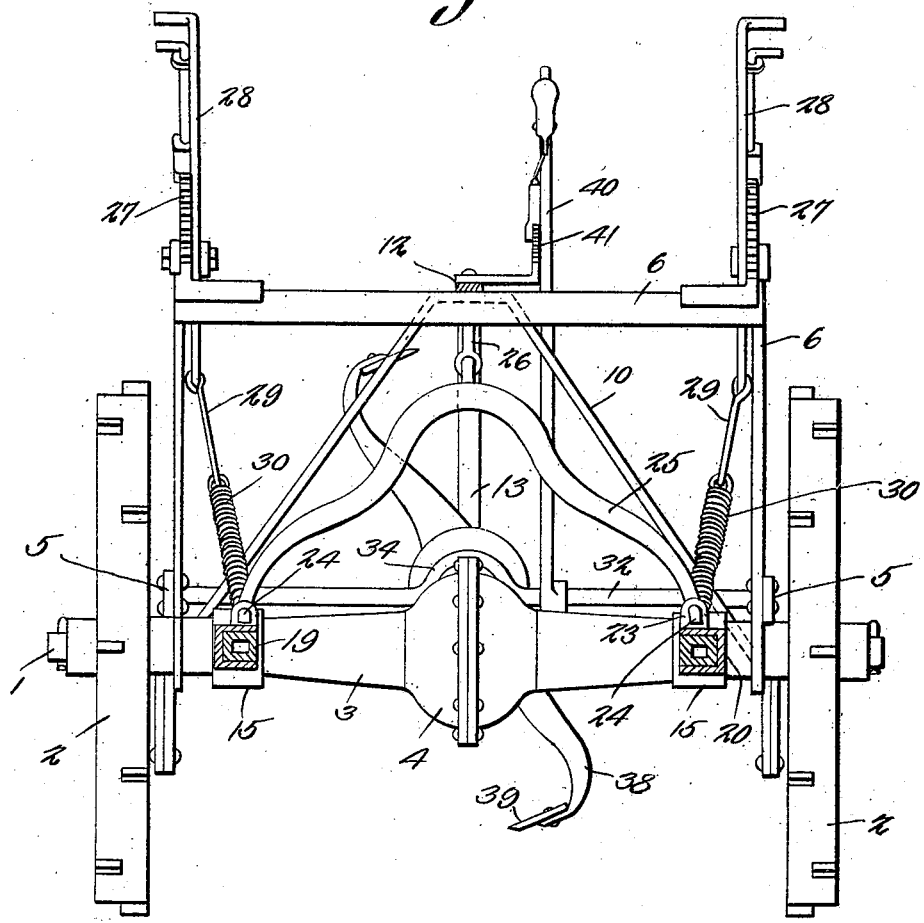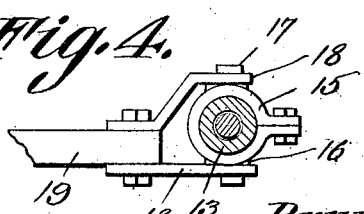

BRUNO SCHWAB, RICHARD SCHNEIDER, AND HAVER HOEGENAUER, OF SAN ANTONIO, TEXAS.

COTTON-CHOPPER.

1,374,474.  Specification of Letters Patent.  Patented Apr. 12, 1921.

Application filed June 21, 1919. Serial No. 305,799.

*To all whom it may concern:*

Be it known that we, BRUNO SCHWAB, RICHARD SCHNEIDER, and HAVER HOEGENAUER, citizens of the United States, residing at San Antonio, in the county of Bexar and State of Texas, have invented a new and useful Cotton-Chopper, of which the following is a specification.

This invention relates to machines for chopping and cultivating cotton, one of its objects being to provide a simple and compact machine which can be placed astride a row and drawn therealong whereby a rotary chopping element will be actuated to cut out plants at regular intervals.

Another object is to provide means for adjusting the chopping element during the forward movement of the machine so that it can be raised or lowered at will.

A further object is to provide means under the constant control of the operator for cultivating between the rows during the chopping operation.

With the foregoing and other objects in view which will appear as the description proceeds, the invention consists of certain novel details of construction and combinations of parts which will be hereinafter more fully described and pointed out in the claim, it being understood that various changes may be made in the construction and arrangement of the parts without departing from the spirit or sacrificing any of the advantages of the invention as set forth in the appended claim.

In the accompanying drawings the preferred form of the invention has been shown.

In said drawings—

Figure 1 is a plan view.

Fig. 2 is a side elevation, one of the supporting wheels being removed and its axle shown in section.

Fig. 3 is a section on line 3—3, Fig. 1.

Fig. 4 is a section on line 4—4, Fig. 1.

Referring to the figures by characters of reference, 1 designates an axle carried by supporting wheels 2 and on this axle is mounted a housing 3 and a differential casing 4. A frame is mounted on the housing 3 and includes side members 5 the rear ends of which are connected by an arch 6 while the front portions are extended forwardly and inwardly, as at 7 and are connected to a draft beam 8 suitably braced, as at 9. Another arch 10 is secured to and extends upwardly from the side members and has its lower terminals connected to the front portion of the frame by braces 11. A top beam 12 is secured upon the middle portions of the arches and has its front end downturned, as at 13 and secured to the beam 8. A brace 14 may be extended forwardly from the beam 12 to the beam 8.

Mounted on the housing 3 are split sleeves 15 each of which has oppositely extending bosses 16 into which extend pivot screws 17 extending through attaching plates 18 secured to the front ends of beams 19. Thus the beams are free to swing upwardly and downwardly relative to the housing 3 and also to swing laterally about the screws or bolts 17. To the beams are attached sleeves 20 to which are clamped the standards of cultivator blades 21, said standards being indicated at 22. Ears 23 are extended upwardly from the sleeves 20 and are engaged loosely by the offset lower ends 24 of a spacing yoke 25. This yoke bridges the space between the beams 19 and is supported in an upstanding position by a link 26 which connects it to the beam 12.

Secured to the arch 6 at each side thereof is a toothed segment 27 and hand levers 28 are connected thereto and adapted to be held thereby, the lower ends of these levers being adjustly engaged by rods 29 which, in turn, are attached to springs 30 secured to the beams 19. By means of these levers the beams can be raised or lowered to regulate the depth of the blades 21 below the surface of the soil.

Journaled in bearings 31 at the sides of the frame is a controlling shaft 32 having a forwardly extending crank 33 carrying a loop 34. In this loop is loosely mounted a sleeve 35 adapted to swing freely with the differential housing or casing 4 and journaled in the sleeve is a shaft having suitable gearing, not shown, whereby motion is transmitted thereto from either of the wheels 2 and their axles 1, said gearing being of the usual differential type. This shaft 36 is secured at its forward end to a head 37 carrying oppositely extending arms 38 to which hoes 39 are detachably connected. A hand lever 40 is secured to and extends upwardly from the shaft 32 and by means thereof the shaft can be rotated so that the loop 34 will raise or lower the sleeve 35 and correspondingly shift the hoes 39 without interfering with their rotation. A toothed segment 41 is provided for holding the lever in any position to which it may be shifted.

It will be obvious that when the machine is drawn forward astride a row of plants the shaft 36 will be rotated and the hoes will successively cut across the row, thereby removing the plants at regular intervals. The operator, who occupies the seat 42 can, by manipulating the lever 40, raise or lower the hoes at will to cut or skip where desired. The blades 21 following after the hoes will cultivate between the rows.

What is claimed is:—

In a cotton chopping machine the combination with a frame and supporting wheels, of a housing interposed between the wheels and mounted for rotation, a sleeve extending radially from the housing, axles connected to the respective wheels and extending into the housing, a differential connecting the axles, a shaft geared to the differential and journaled within the sleeve, a chopping hoe connected to and revoluble with the shaft, means under the control of the operator and engaging the sleeve for swinging said sleeve upwardly or downwardly to a desired elevation and rotating the housing on the axles, said means operating to hold the sleeve and housing against rotation with the axles.

In testimony that we claim the foregoing as our own, we have hereto affixed our signatures in the presence of two witnesses.

BRUNO SCHWAB.
RICHARD SCHNEIDER.
HAVER HOEGENAUER.

Witnesses:
WALTER MUELLER,
BEN R. WAHL.